(12) United States Patent
Barton

(10) Patent No.: US 12,090,625 B2
(45) Date of Patent: Sep. 17, 2024

(54) COUPLING MECHANISM FOR A UTILITY MODULE

(71) Applicant: Milwaukee Electric Tool Corporation, Brookfield, WI (US)

(72) Inventor: George Barton, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 316 days.

(21) Appl. No.: 17/522,547

(22) Filed: Nov. 9, 2021

(65) Prior Publication Data

US 2022/0126437 A1  Apr. 28, 2022

Related U.S. Application Data

(63) Continuation of application No. PCT/US2021/055965, filed on Oct. 21, 2021.

(60) Provisional application No. 63/171,877, filed on Apr. 7, 2021, provisional application No. 63/159,579, filed on Mar. 11, 2021, provisional application No. 63/105,710, filed on Oct. 26, 2020.

(51) Int. Cl.
*B25H 3/02* (2006.01)
*F16M 13/02* (2006.01)

(52) U.S. Cl.
CPC ............. *B25H 3/022* (2013.01); *F16M 13/02* (2013.01)

(58) Field of Classification Search
CPC .................... B25H 3/00–022; F16M 13/00–02
See application file for complete search history.

(56) References Cited

U.S. PATENT DOCUMENTS

| 1,240,705 | A |   | 9/1917 | Grode |
| 3,891,172 | A |   | 6/1975 | Einhorn |
| 4,653,716 | A |   | 3/1987 | Sakaguchi |
| 4,795,180 | A | * | 1/1989 | Polcyn ..................... B25H 5/00 |
|   |   |   |   | 280/32.6 |
| 4,832,193 | A | * | 5/1989 | Kime ....................... A45C 7/00 |
|   |   |   |   | 206/315.11 |
| 4,880,122 | A | * | 11/1989 | Martindell ............. B25H 3/003 |
|   |   |   |   | 206/374 |
| 4,911,296 | A | * | 3/1990 | Hart, Jr. .................. B60R 11/06 |
|   |   |   |   | 220/523 |
| D342,005 | S |   | 12/1993 | Forsberg |
| 5,277,387 | A |   | 1/1994 | Lewis et al. |
| 5,572,776 | A |   | 11/1996 | Murphy et al. |
| 5,595,228 | A | * | 1/1997 | Meisner ................... B25H 1/04 |
|   |   |   |   | 144/285 |

(Continued)

FOREIGN PATENT DOCUMENTS

| CN | 2496800 | 6/2002 |
| CN | 202161280 | 3/2012 |

(Continued)

OTHER PUBLICATIONS

International Search Report and Written Opinion for International Application No. PCT/US2021/055965, dated Mar. 29, 2022, 12 pages.

*Primary Examiner* — Kareen K Thomas
(74) *Attorney, Agent, or Firm* — Reinhart Boerner Van Deuren s.c.

(57) ABSTRACT

A coupling mechanism for a utility module is provided. The coupling mechanism includes an locking panels that interface with opposing tabs of a modular storage system. The locking panels actuate between a locked position and an unlocked position.

13 Claims, 12 Drawing Sheets

(56) References Cited

U.S. PATENT DOCUMENTS

| | | |
|---|---|---|
| 5,715,951 A | 2/1998 | Dembicks |
| 5,725,107 A | 3/1998 | Dembicks |
| 5,782,314 A * | 7/1998 | Zeitler .................. E06C 7/14 248/210 |
| 5,855,284 A | 1/1999 | Dembicks |
| 5,897,001 A | 4/1999 | Dembicks |
| 5,913,380 A * | 6/1999 | Gugel .................. E06C 7/14 248/210 |
| 6,932,312 B1 | 8/2005 | Chen |
| D547,048 S | 7/2007 | Conway et al. |
| D636,657 S | 4/2011 | Quinlan et al. |
| D642,039 S | 7/2011 | Forsberg et al. |
| D656,883 S | 4/2012 | Patalak et al. |
| D666,134 S | 8/2012 | Patalak et al. |
| 8,267,363 B2 | 9/2012 | Begic et al. |
| 8,485,482 B2 | 7/2013 | Patalak et al. |
| 8,528,871 B2 | 9/2013 | Begic et al. |
| D771,476 S | 11/2016 | Prince et al. |
| 9,615,722 B2 | 4/2017 | Mesa et al. |
| D796,750 S | 9/2017 | Hederstierna et al. |
| 10,052,012 B2 | 8/2018 | Mesa et al. |
| 10,125,919 B2 | 11/2018 | Forsberg |
| 10,165,927 B2 | 1/2019 | Mesa et al. |
| 10,405,676 B1 | 9/2019 | Underwood |
| 10,463,226 B2 | 11/2019 | Mesa et al. |
| 10,583,962 B2 | 3/2020 | Brunner et al. |
| 10,772,444 B2 | 9/2020 | Stas |
| 2002/0070137 A1 * | 6/2002 | Hedges .................. E06C 7/14 206/373 |
| 2011/0303798 A1 | 12/2011 | Bader et al. |
| 2013/0334383 A1 | 12/2013 | Begic et al. |
| 2017/0166352 A1 | 6/2017 | Hoppe et al. |
| 2018/0256766 A1 | 9/2018 | Gareiss et al. |
| 2019/0225371 A1 | 7/2019 | Hoppe et al. |
| 2019/0359051 A1 | 11/2019 | Stancu |
| 2020/0147781 A1 | 5/2020 | Squiers et al. |
| 2020/0165036 A1 | 5/2020 | Squiers et al. |
| 2023/0122425 A1 | 4/2023 | Camp et al. |

FOREIGN PATENT DOCUMENTS

| | | |
|---|---|---|
| EP | 0507721 | 12/1994 |
| EP | 1452789 | 7/2006 |
| JP | 09-078914 | 3/1997 |
| JP | 2004-092283 | 3/2004 |
| WO | WO8500132 | 1/1985 |
| WO | WO9300202 | 1/1993 |
| WO | WO05042212 | 5/2005 |

* cited by examiner

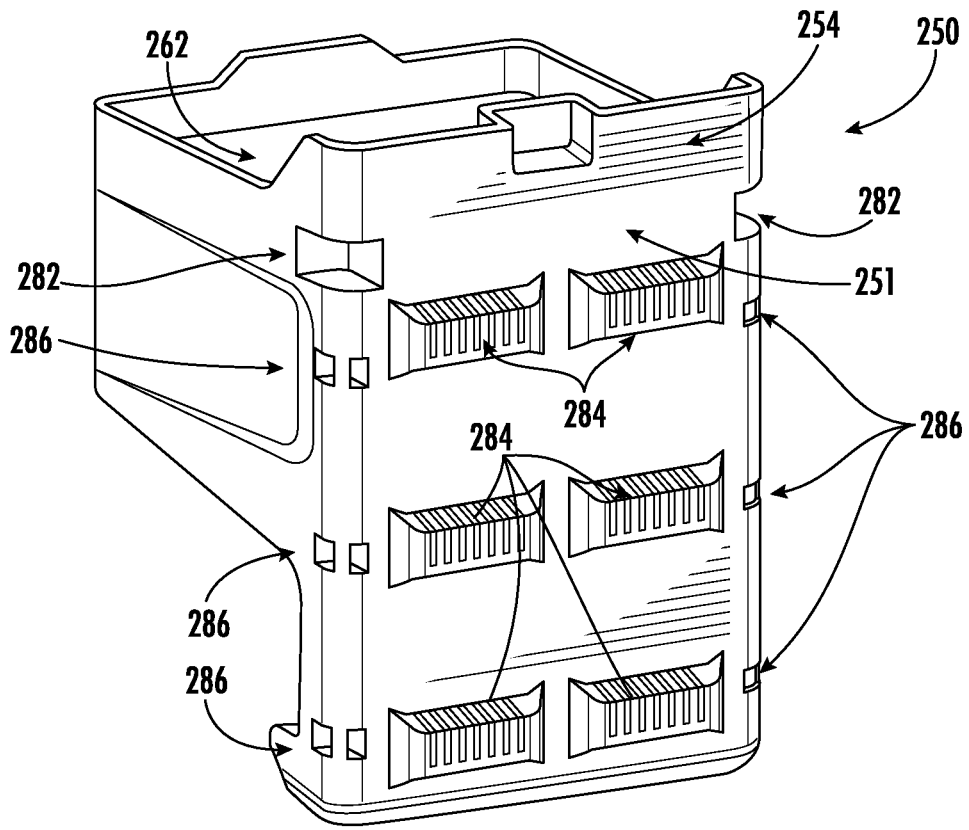
FIG. 20
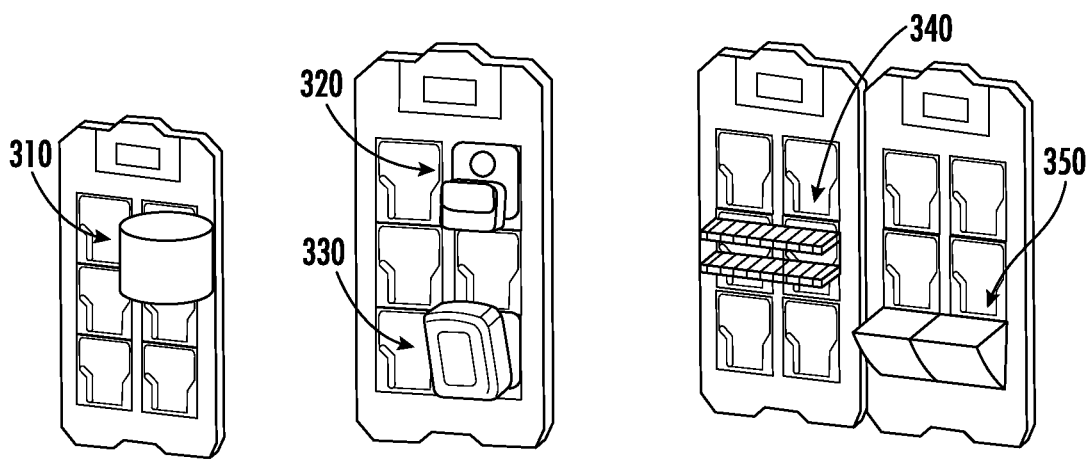
FIG. 21
FIG. 22
FIG. 23

COUPLING MECHANISM FOR A UTILITY MODULE

CROSS-REFERENCE TO RELATED PATENT APPLICATION

The present application is a continuation of International Application No. PCT/US2021/055965, filed Oct. 21, 2021, which claims the benefit of and priority to U.S. Provisional Application No. 63/171,877, filed on Apr. 7, 2021, U.S. Provisional Application No. 63/159,579, filed on Mar. 11, 2021, and U.S. Provisional Application No. 63/105,710, filed on Oct. 26, 2020, each of which are incorporated herein by reference in their entirety.

BACKGROUND OF THE INVENTION

The present disclosure is directed generally to the field of containers and related devices. The present disclosure relates specifically to a utility module with a coupling mechanism to detachably couple the utility module to a tool storage device, unit or container.

Tool storage units are often used to transport tools and tool accessories. Some storage units are designed to incorporate into a modular storage system. Various accessories can be configured to interface with a storage unit in a modular storage system, such as smaller containers that couple to the modular storage system.

SUMMARY OF THE INVENTION

One embodiment of the invention relates to a coupling mechanism including a housing, a first locking panel that slideably actuates along a first axis, a second locking panel that slideably actuates along the first axis, a locking mechanism rotatably coupled to the housing, and a first biasing element that biases the first locking panel towards the second locking panel. The first locking panel includes a first inner surface and an opposing first outer surface. The second locking panel includes a second inner surface and an opposing second outer surface, the second outer surface facing away from the first outer surface. The locking mechanism rotates with respect to the housing around a second axis. The locking mechanism actuates between an unlocked position and a locked position. The locking mechanism includes an interfacing portion that interfaces with each of the first inner surface and the second inner surface. The first outer surface and the second outer surface define a first width when the locking mechanism is in the unlocked position. When the locking mechanism actuates from the unlocked position to the locked position the locking mechanism biases the first locking panel and the second locking panel away from each other such that when the locking mechanism is in the locked position the first outer surface and the second outer surface define a second width greater than the first width.

Another embodiment of the invention relates to a coupling mechanism including a housing, a first locking panel that slideably actuates along a first axis, a second locking panel that slideably actuates along the first axis, the first locking panel and the second locking panel collectively defining a width, and a cam rotatably coupled to the housing. The cam includes a periphery that interfaces with each of the first locking panel and the second locking panel. The cam rotates with respect to the housing around a second axis, and the cam actuates between an unlocked position and a locked position.

The cam includes a first portion of the periphery that interfaces with the first locking panel, a second portion of the periphery that interfaces with the second locking panel. The first portion extends from a first end to a second end, and the second portion extends from a third end to a fourth end. A first ledge that extends between the first end of the first portion and the fourth end of the second portion, and a second ledge that extends between the third end of the second portion and the second end of the first portion. The first end extends a first distance from the second axis and the second end extends a second distance from the second axis further than the first distance. The first portion biases the first locking panel away from the second locking panel when the cam actuates from the unlocked position to the locked position. The third end extends the first distance from the second axis and the fourth end extends the second distance from the second axis. The second portion biases the second locking panel away from the first locking panel when the cam actuates from the unlocked position to the locked position. The first ledge biases the second locking panel towards the first locking panel when the cam actuates from the locked position to the unlocked position. The second ledge biases the first locking panel towards the second locking panel when the cam actuates from the locked position to the unlocked position.

Another embodiment of the invention relates to a storage structure including a back panel including a rear surface and an opposing front surface, a plurality of coupling mechanisms extending from the rear surface, a plurality of panels extending from the front surface, and a recess defined by the bottom panel. The plurality of coupling mechanisms each include a plurality of tongues that are offset from the rear surface. A subset of the plurality of panels define a chamber defined in part by a bottom panel of the plurality of panels. The bottom panel extends from the front surface to an opposing outer edge. The recess extends from the outer edge towards the back panel. The recess is defined by an interior edge of the bottom panel, the interior edge extending away from an upper surface of the bottom panel and defining an angle with respect to the upper surface between 110 degrees and 160 degrees.

Another embodiment of the invention relates to a support structure including a panel including a rear surface and an opposing front surface, the panel extending along a longitudinal axis, a plurality of coupling mechanisms extending from the rear surface, and an elongate structure coupled to the panel and extending from the front surface away from the rear surface. The plurality of coupling mechanisms each include a first tongue extending in a first direction and a second tongue extending second direction opposite the first direction. The first tongue and the second tongue are each offset from the rear surface. The elongate structure extends to a distal end furthest from the panel, the distal end extending at least partially upward when longitudinal axis is arranged vertically.

Another embodiment of the invention relates to a utility module including a housing, a locking mechanism rotatably coupled to the housing, the locking mechanism rotating with respect to the housing around an axis, a first locking panel and a second locking panel. The first locking panel includes a first inner surface and an opposing first outer surface. The first inner surface interfaces with the locking mechanism, and the first outer surface faces away from the locking mechanism in a first direction. The second locking panel includes a second inner surface and an opposing second outer surface. The second inner surface interfaces with the locking mechanism, and the second outer surface faces away from the locking mechanism in a second direction opposite the first direction. The locking mechanism actuates between an unlocked position and a locked position. When the locking mechanism is in the unlocked position, the first outer surface and the second outer surface define a first width, and when the locking mechanism is in the locked position the locking mechanism biases the first locking panel and the second locking panel away from each other such that the first outer surface and the second outer surface define a second width greater than the first width.

In a specific embodiment, the first locking panel and the second locking panel each include an upper surface configured to interface against opposing tabs extending over a recess defined by a modular storage unit when the coupling mechanism is arranged in locked position. In a specific embodiment, the coupling mechanism includes a first biasing element that biases the first locking panel towards the axis, and a second biasing element that biases the second locking panel towards the axis. In a specific embodiment, the coupling mechanism includes a shaft coupled to the locking mechanism. The shaft includes a detent that biases the locking mechanism to remain in the locked position.

Another embodiment of the invention relates to a coupling mechanism including a housing, a first locking panel that slideably actuates along an axis, a second locking panel that slideably actuates along the axis, and a cam coupled to the housing. The first locking panel and the second locking panel collectively define a width that is increased and decreased as the cam actuates between a locked position and an unlocked position. The cam rotates with respect to the housing around an axis. When the cam actuates from the unlocked position to the locked position, the cam interfaces with the first locking panel and the second locking panel to increase the width defined by first and second locking panels. When the cam actuates from the locked position to the unlocked position, the cam interfaces with the first locking panel and the second locking panel to decrease the width defined by first and second locking panels.

Another embodiment of this invention relates to a support structure including a first coupling mechanism with actuating locking panels, and a second coupling mechanism with locking panels that are fixed with respect to each other. The support structure includes one or more hooks that from a body away from the coupling mechanisms.

Another embodiment of this invention relates to a utility module including a back panel, a plurality of coupling mechanisms extending from the back panel, a first plurality of panels extending from the back panel that define a chamber. A recess is defined by a bottom panel of the plurality of panels. The recess extends from an outer edge of the bottom panel towards the back panel. The recess includes a peripheral edge that defines an angle with respect to an upper surface of the bottom panel between 110 degrees and 160 degrees.

In a specific embodiment, the utility module includes a ledge that extends downward from the bottom panel and inward towards the recess. The ledge defines the periphery of the recess. In a specific embodiment, a first coupling mechanism of the plurality of coupling mechanisms includes actuating locking panels and a second coupling mechanism of the plurality of coupling mechanisms includes fixed locking panels.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

FIG. 20 is a perspective view from behind of the support structure FIG. 16, according to an exemplary embodiment.

FIG. 21 is a perspective view of a support structure, according to an exemplary embodiment.

FIG. 22 is a perspective view of two support structures, according to exemplary embodiments.

FIG. 23 is a perspective view of two support structures, according to exemplary embodiments.

DETAILED DESCRIPTION

Figure 1:
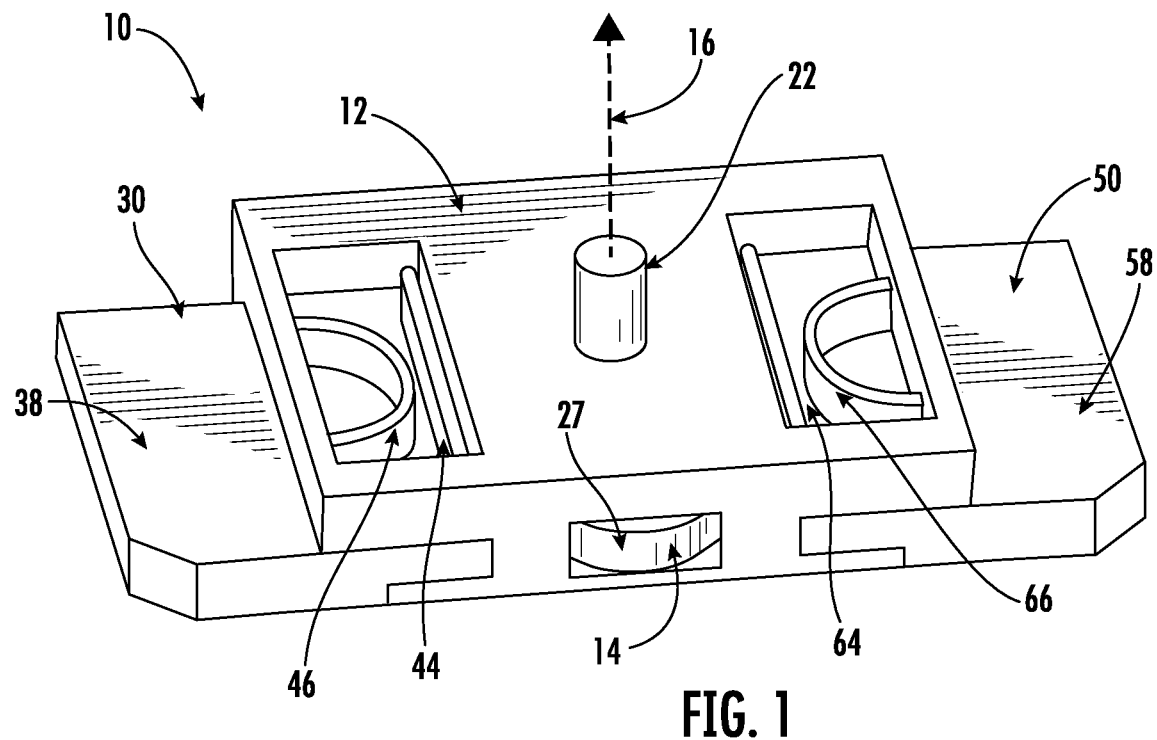
FIG. 1 is a perspective view of a coupling mechanism to couple a utility module to a modular storage unit, according to an exemplary embodiment.
Figure 2:
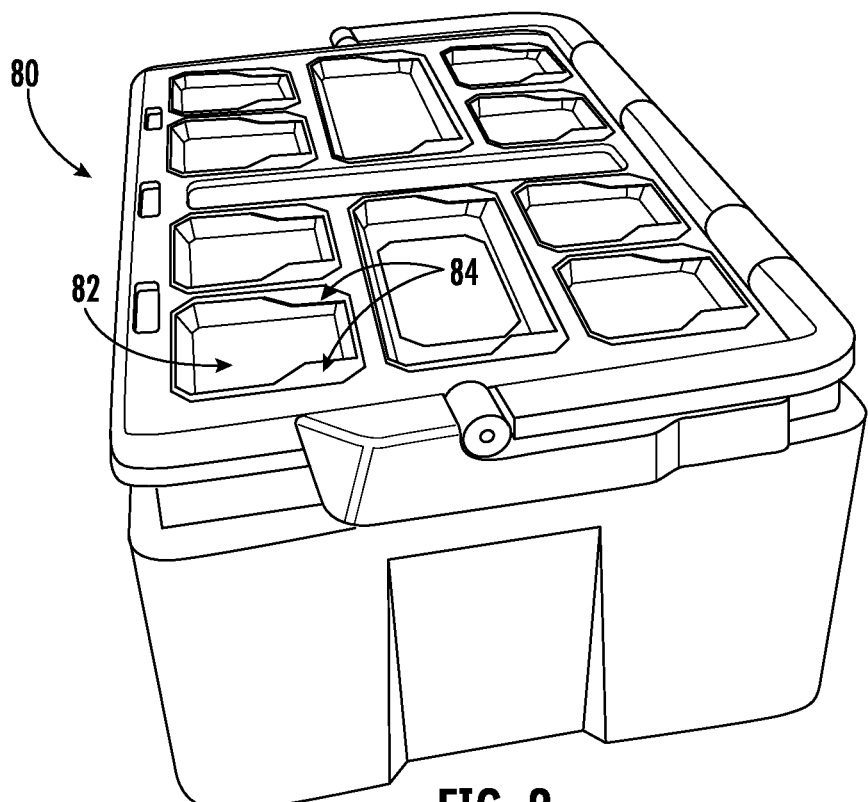
FIG. 2 is a perspective view of a modular storage unit that interfaces with the coupling mechanism of FIG. 1, according to an exemplary embodiment.

Referring generally to the figures, various embodiments of a coupling mechanism for a utility module are shown. A utility module includes a coupling mechanism configured to selectively couple and decouple with units in a modular system, such as a tool storage unit. The coupling mechanism includes an interface to couple to one or more coupling recesses of the tool storage unit. The coupling mechanism provides the ability to quickly couple and decouple utility modules to a modular system. The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, beverage containers, etc., of any shape and size, and wherein any utility module can be detachably attached to the modular system.

When coupled to the tool storage unit, the coupling mechanism of the utility module is biased to remain coupled to the tool storage unit when the tool storage unit is being moved, such as being moved around a construction site. In specific embodiments, the coupling mechanism of the utility module is a portion of a base or lower portion of the utility module with one or more structures that are shaped to releasably/reversibly engage with a coupling structure or recess of the tool storage unit.

Referring to FIGS. 1-5, a device to couple a container, unit, device, and/or utility module, shown as coupling mechanism 10, is shown according to an exemplary embodiment. Coupling mechanism 10 is configured to couple a container, unit, device, and/or utility module to a modular storage unit, shown as tool storage unit 80. Tool storage unit 80 includes one or more recesses 82, each of which include two opposing tabs 84 that extend above recess 82. When coupling mechanism 10 is coupled to tool storage unit 80, upper surface 38 of first locking panel 30 and upper surface 58 of second locking panel 50 are configured to interface with opposing tabs 84 over recess 82 defined by a modular storage unit 80 such that the coupling mechanism 10 is configured to be coupled within the recess 82 of the modular storage unit 80.

Coupling mechanism 10 includes a bottom structure, shown as housing 12, coupled to a bottom of a utility module. Coupling mechanism 10 includes first locking panel 30 and second locking panel 50. First locking panel 30 includes a first inner surface 32 and an opposing first outer surface 34, the first locking panel 30 slideably actuating along a first axis 28. Second locking panel 50 includes a second inner surface 52 and an opposing second outer surface 54, the second outer surface 54 facing away from the first outer surface 32, and the second locking panel 50 slideably actuating along the first axis 28. First locking panel 30 and second locking panel 50 extend and retract from housing 12 via interfacing with locking mechanism 14.

Locking mechanism 14 is rotatably coupled to housing 12 and rotates with respect to housing 12 about axis 16. Shaft 22 is coupled to locking mechanism 14. Shaft 22 is rotated to actuate the positioning of locking mechanism 14, thereby also actuating first locking panel 30 and second locking panel 50. Locking mechanism 14 actuates between an unlocked position and a locked position, and the locking mechanism 14 includes an interfacing portion 27 (e.g., an oval-shaped element) that interfaces with each of the first inner surface 32 and the second inner surface 52. In a specific embodiment, interfacing portion 27 of locking mechanism 14 defines an oval shape. In a specific embodiment, interfacing portion 27 of the locking mechanism 14 defines a first diameter 72 and a second diameter 70 longer than the first diameter 72, wherein the first diameter 72 is aligned with the first axis 28 when the locking mechanism 14 is in the unlocked position, and the second diameter 70 is aligned with the first axis 28 when the locking mechanism 14 is in the locked position. A biasing element, shown as spring 46, interfaces with inner ledge 44 of first locking panel 30 to bias first locking panel 30 towards axis 16 and second locking panel 50, such as when locking mechanism 14 is not in the locked position (e.g., such as an intermediate point between the locked position and the unlocked position). Similarly, a biasing element, shown as spring 66, interfaces with inner ledge 64 of second locking panel 50 to bias second locking panel 50 towards axis 16 and first locking panel 30, such as when locking mechanism 14 is not in the locked position.

Figures 3, 4:
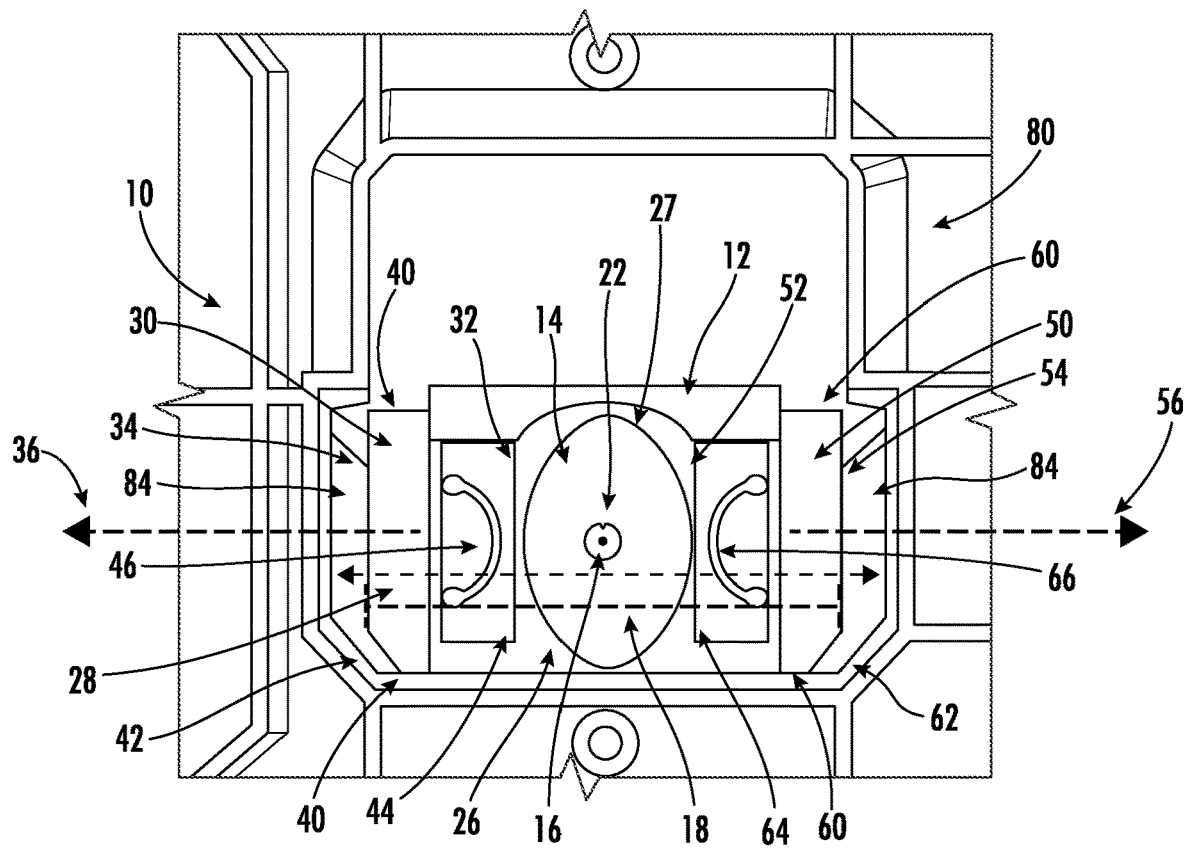
FIG. 3 is a schematic view of the coupling mechanism of FIG. 1 and the modular storage unit of FIG. 2, according to an exemplary embodiment.
FIG. 4 is a schematic view of the coupling mechanism of FIG. 1 coupled to the modular storage unit of FIG. 2, according to an exemplary embodiment.
Figure 5:
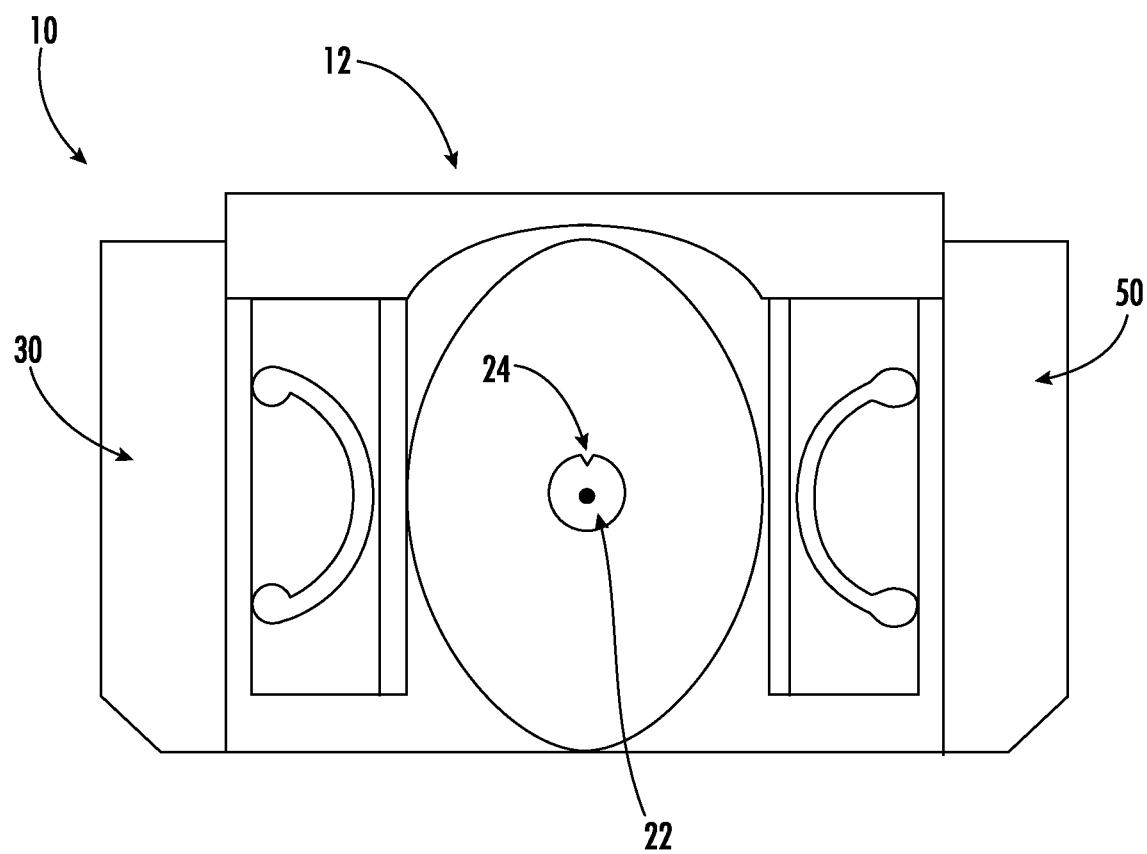
FIG. 5 is a schematic view of the coupling mechanism of FIG. 1 and the modular storage unit of FIG. 2, according to an exemplary embodiment.

Turning to FIG. 3-5, various aspects of coupling mechanism 10 are shown. FIGS. 3-5 depict schematic of coupling mechanism 10 interfacing with tool storage unit 80 from a bottom view (e.g., from the perspective of the recess 82 (shown in FIG. 2) of tool storage unit 80 looking in an upward direction).

Coupling mechanism 10, and particularly, locking mechanism 14, actuates between an unlocked position (FIG. 3) and a locked position (FIG. 4). When in the unlocked position (FIG. 3), first outer surface 34 of first locking panel 30 and second outer surface 54 of second locking panel 50 define a first width 18. When the locking mechanism 14 actuates from the unlocked position to the locked position the locking mechanism 14 biases the first locking panel 30 and the second locking panel 50 away from each other such that when the locking mechanism 14 is in the locked position the first outer surface 34 and the second outer surface 54 define a second width 20 greater than the first width 18. As a result of coupling mechanism 10 being arranged in the locked position, first locking panel 30 and second locking panel 50 interface with tabs 84 of tool storage unit 80, thereby securing tool storage unit 80 to the utility module that coupling mechanism 10 is coupled to.

In use, after coupling mechanism is inserted in recess 82 of tool storage unit 80, shaft 22 is rotated, thereby rotating locking mechanism 14. Peripheral surface 26 of locking mechanism 14 interfaces with first inner surface 32 of first locking panel 30 to bias first locking panel 30 in first direction 36. Peripheral surface 26 of locking mechanism 14 also interfaces with second inner surface 52 of second locking panel 50 to bias second locking panel 50 in second direction 56 opposite first direction 36.

In a specific embodiment, first locking panel 30 includes opposing side surfaces 40, which extend perpendicularly to first inner surface 32 and first outer surface 34. First locking panel 30 also includes angled surface 42, which extends between first outer surface 34 and one of opposing side surfaces 40. Angled surface 42 defines an angle greater than 90 degrees and less than 180 degrees with each of first outer surface 34 and side surface 40.

Similarly, second locking panel 50 includes opposing side surfaces 60, which extend perpendicularly to second inner surface 52 and second outer surface 54. Second locking panel 50 also includes angled surface 62, which extends between second outer surface 54 and one of opposing side surfaces 60. Angled surface 62 defines an angle greater than 90 degrees and less than 180 degrees with each of second outer surface 54 and side surface 60.

In a specific embodiment, shaft 22 includes detent 24 that biases locking mechanism 14 to remain in the locked position. Detent 24 is configured to interface with another element, such as a protrusion, to bias shaft 22 to remain stationary with respect to housing. In one example, detent 24 interfaces with a protrusion to bias coupling mechanism 10 to remain in the locked position In a specific embodiment, coupling mechanism 10 and coupling recesses 82 of tool storage unit 80 are compatible with the coupling mechanism(s) described in International Patent Application No. PCT/US2018/044629, which is hereby incorporated by references in its entirety.

Figure 6:
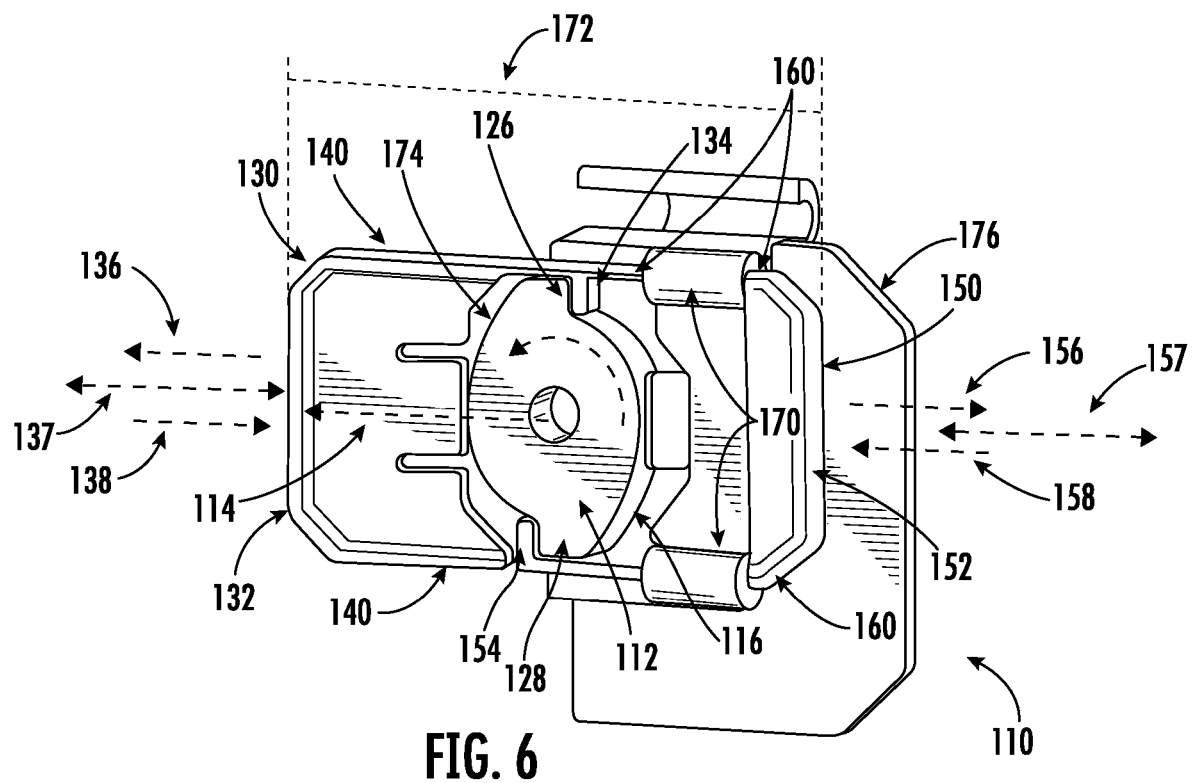
FIG. 6 is a perspective view of a coupling mechanism, according to an exemplary embodiment.
Figure 7:
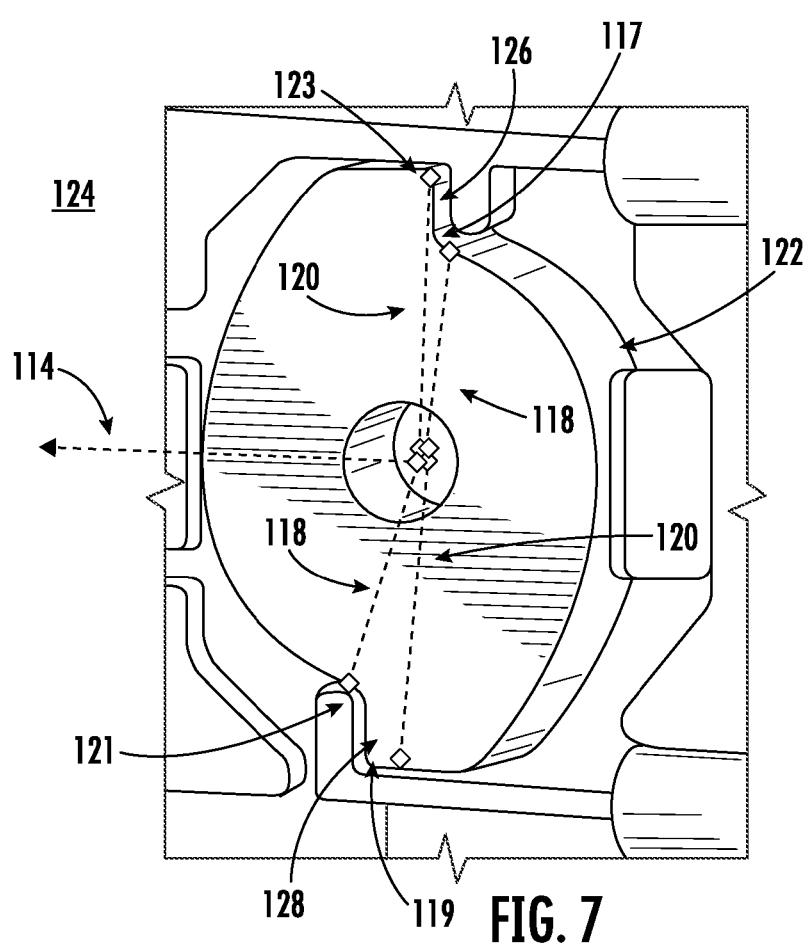
FIG. 7 is a detailed perspective view of the coupling mechanism of FIG. 6, according to an exemplary embodiment.
Figure 8:
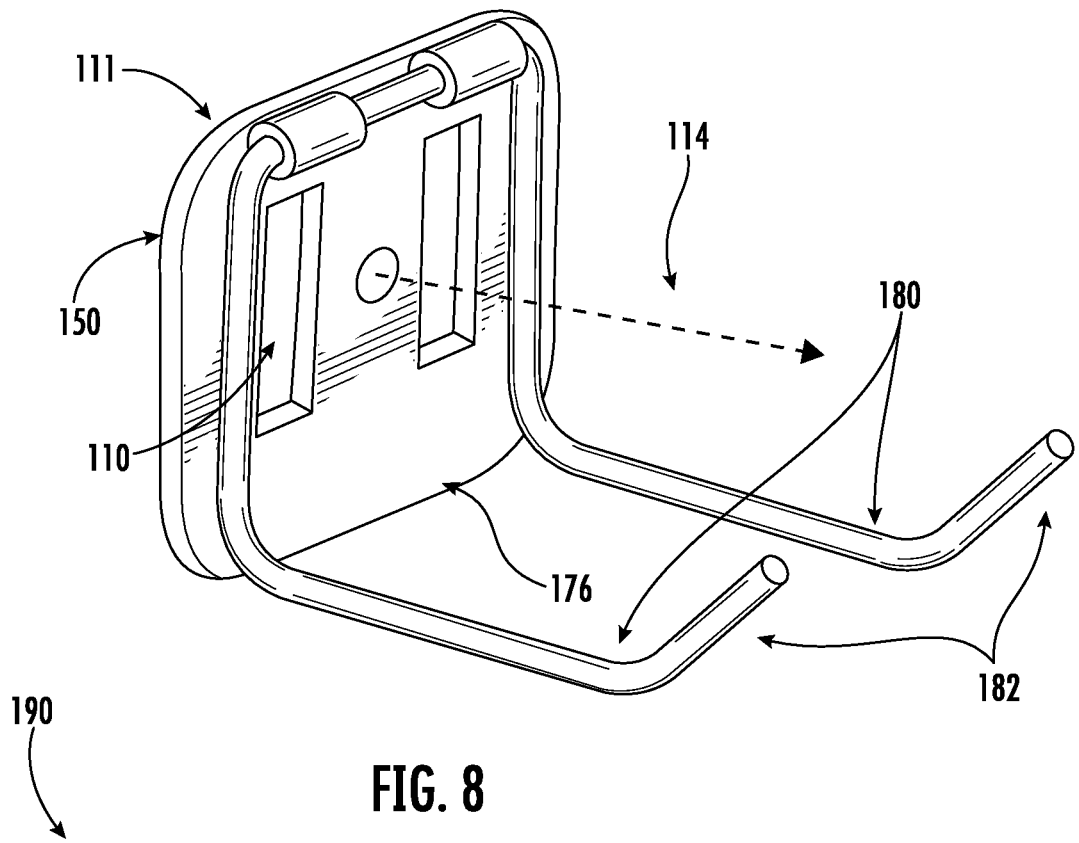
FIG. 8 is a device including the coupling mechanism of FIG. 6, according to an exemplary embodiment.

Referring to FIGS. 6-8, coupling mechanism 110 is shown according to an exemplary embodiment. Coupling mechanism 110 is substantially the same as coupling mechanism 10 except for the differences discussed herein.

Coupling mechanism includes an actuating component, shown as cam 112, rotatably coupled to housing 111. Cam 112 interfaces with first locking panel 130 and second locking panel 150 to actuate the width 172 of first and second locking panels 130, 150. First locking panel 130 slideably actuates along axis 137, and second locking panel slideably actuates along axis 157. In a specific embodiment, axis 137 is aligned with axis 157 such that axis 137 and axis 157 are the same axis.

Cam 112, first locking panel 130, and second locking panel 150 actuate between a locked position and an unlocked position. In the locked position, first locking panel 130 and/or second locking panel 150 engage with tabs 84 extending above recess 82 in tool storage unit 80. When in the locked position, locking projection 132 of first locking panel 130 and/or locking projection 152 of second locking panel 150 engage beneath tabs 84 that extend above a recess 82. In the unlocked position, first locking panel 130 and second locking panel 150 are retracted (e.g., width 172 is decreased) and coupling mechanism 110 can be removed from recess 82.

Cam 112 rotates with respect to housing 176 around axis 114. In a specific embodiment, axis 114 is perpendicular to axis 137 and axis 157. When cam 112 rotates in rotational direction 174, periphery 116 of cam 112 interfaces with first locking panel 130 and second locking panel 150, thereby exerting a pushing force on first locking panel 130 in direction 136 and periphery 116 of cam 112 exerts a pushing force on second locking panel 150 in direction 156. As a result, width 172 is expanded and first and second locking panels 130, 150 engage with tabs in a recess.

In a specific embodiment, periphery 116 of cam 112 includes a first portion 122 that interfaces with second locking panel 150, the first portion 122 extending from a first end 117 to a second end 119. The first portion 122 defines a radius that gradually increases from first radius 118 to second radius 120 longer than the first radius. The first portion 122 biases the second locking panel 150 away from the first locking panel 130 when the cam 112 actuates from the unlocked position to the locked position. Second portion 124 similarly extends from third end 121 to fourth end 123, and defines a radius that gradually increases from first radius 118 to second radius 120. In a specific embodiment, the increasing radius of periphery 116 exerts the expanding force on first and second locking panels 130, 150 when cam 112 is rotated in direction 174.

To retract first and second locking panels 130, 150, cam 112 is rotated opposite direction 174. When cam 112 is rotated opposite direction 174, first ledge 126 interfaces with return projection 134 of first locking panel 130, thereby exerting a force on first locking panel 130 in direction 138. Similarly, when cam 112 is rotated opposite direction 174, second ledge 128 interfaces with return projection 154 of second locking panel 150, thereby exerting a force on second locking panel 150 in direction 158. As a result, width 172 of first and second locking panels 130, 150 is reduced until coupling mechanism 110 disengages with tabs of a modular tool storage unit. In a specific embodiment, first ledge 126 defines first interfacing surface 127 that interfaces with first locking panel 130, and second ledge 128 defines second interfacing surface 129 that interfaces with second locking panel 150. In a specific embodiment, first interfacing surface 127 is generally radially aligned with axis 114, such as being exactly radially aligned, and second interfacing surface 129 is generally radially aligned with axis 114, such as being exactly radially aligned.

First locking panel 130 includes a slideable component, shown as rails 140. Rails 140 interface with guide 170 of housing 176 to permit first locking panel 130 to slide in direction 136 and direction 138. Similarly, second locking panel 150 includes a sliding component, shown as rails 160, that permits second locking panel 150 to slide in direction 156 and direction 158.

In a specific embodiment, a device for coupling other objects, shown as support structure 180, is coupled to coupling mechanism 110. Support structure 180 includes supports, shown as hooks 182, that project from housing 176. In use, cam 112 is rotated around axis 114 with respect to housing 176 to engage and disengage coupling mechanism 110.

Figure 9:
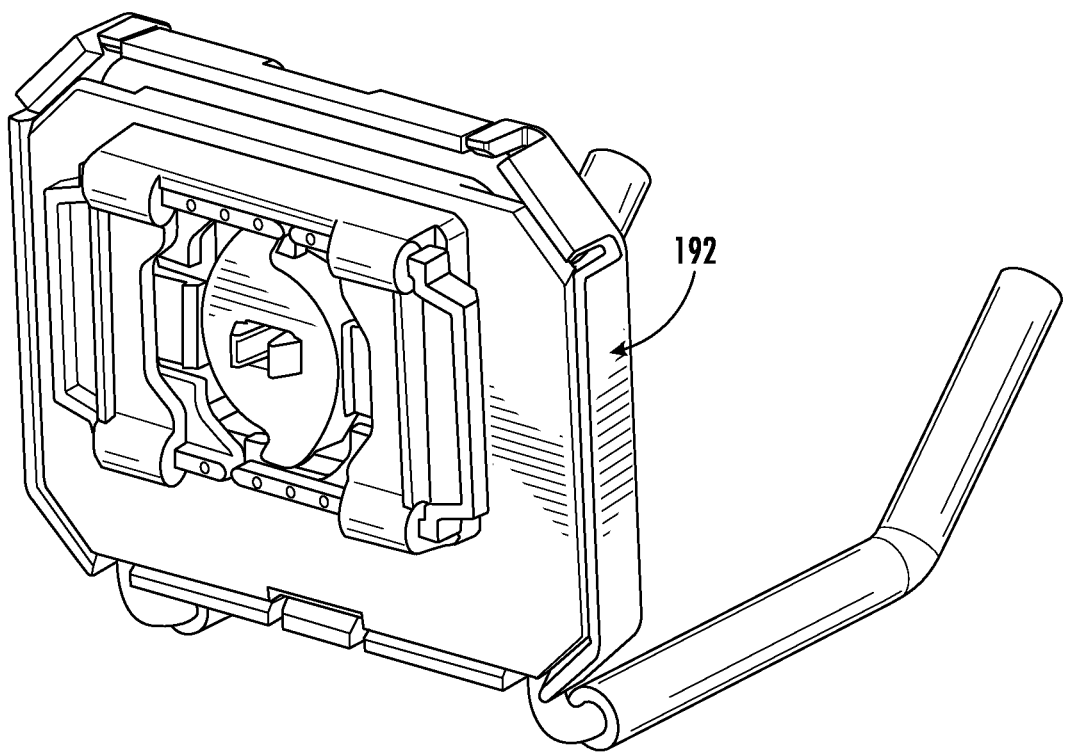
FIG. 9 is a perspective view of a coupling mechanism, according to an exemplary embodiment.
Figure 10:
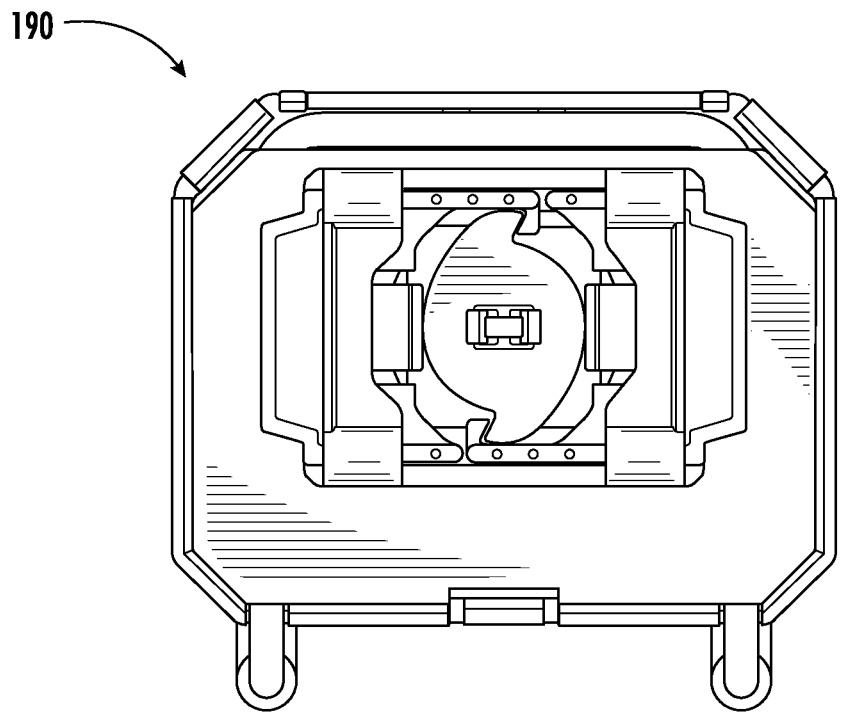
FIG. 10 is a detailed perspective view of the coupling mechanism of FIG. 9, according to an exemplary embodiment.
Figure 11:
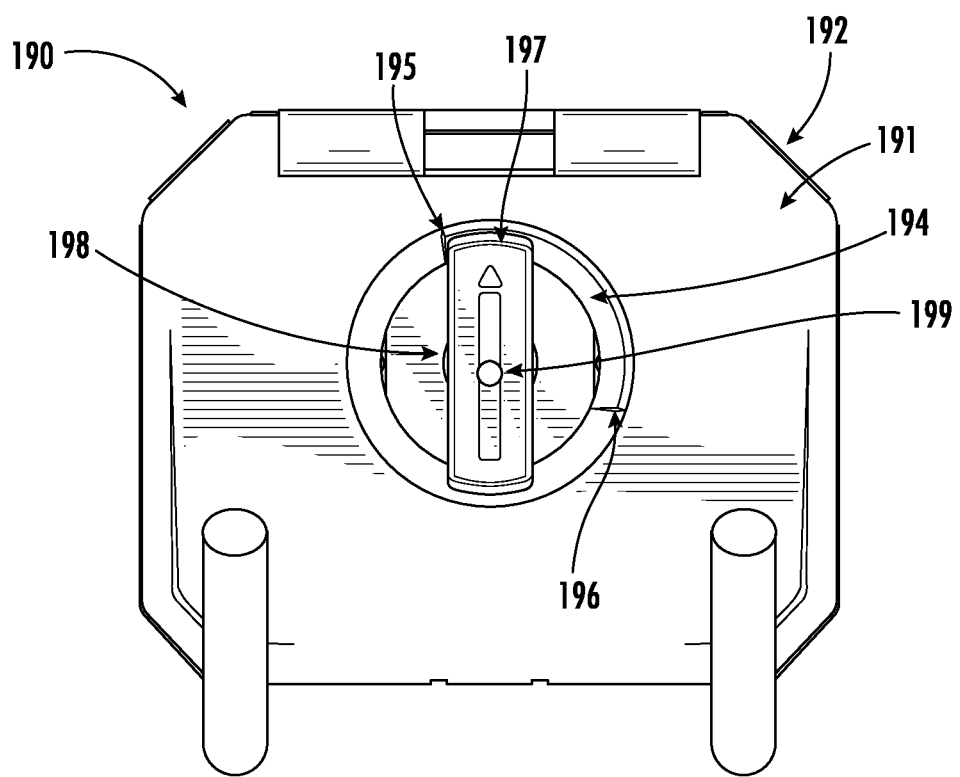
FIG. 11 is a device including the coupling mechanism of FIG. 9, according to an exemplary embodiment.

FIGS. 9-11, coupling mechanism 190 is shown according to an exemplary embodiment. Coupling mechanism 190 is substantially the same as coupling mechanism 110 except for the differences discussed herein. In particular, coupling mechanism 190 includes a curved recess 194 in a front surface 191 of housing 192, and an interfacing element 198 that is coupled to the cam in the rear of the coupling mechanism, the cam actuating locking panels similar to coupling mechanism 110.

Coupling mechanism 190 includes housing 192. Housing 192 includes a front surface 191 that faces away from a first locking panel and a second locking panel. The coupling mechanism 190 includes a curved recess 194 in the front surface 191 of the housing 192. The curved recess 194 extends circumferentially around the second axis 199 from a first end 195 to a second end 196. The coupling mechanism 190 includes an interfacing element 198 rotatably coupled to the housing 192. The interfacing element 198 is coupled to a cam that interfaces with the first and second locking panels (similar to coupling mechanism 110) such that the interfacing element rotates with respect to the housing 192 about the second axis 199. A portion of the interfacing element 198, shown as end 197, rotates within the recess 194 between the first end 195 and the second end 196 of recess 194 when the cam actuates between an unlocked position and a locked position.

Figure 12:
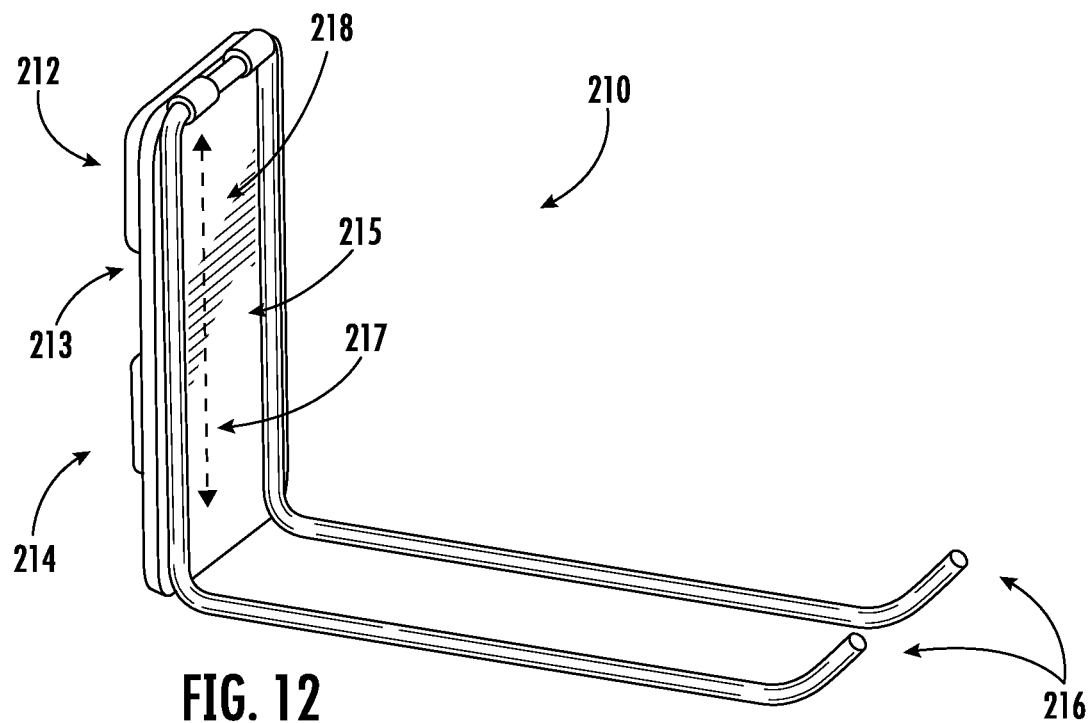
FIG. 12 is a perspective view of a support structure, according to an exemplary embodiment.

Referring to FIG. 12, support structure 210 is shown according to an exemplary embodiment. Support structure 210 is substantially the same as support structure 180 except for the differences discussed herein.

Support structure 210 includes panel 218, panel 218 including a front surface 215 and an opposing rear surface 213. Panel 218 extends along longitudinal axis 217.

Support structure 210 includes an elongate structure, such as a support element, shown as hooks 216, extending laterally from front surface 215 of panel 218. Hooks 216 are coupled to panel 211 and extend from front surface 215 in a direction away from rear surface 213. In contrast to hooks 182 of support structure 180, hooks 216 are elongated and extend a greater distance from panel 218. Support structure includes a plurality of coupling mechanisms extending from rear surface 213, shown as coupling mechanism 212 and coupling mechanism 214. In various embodiments, the plurality of coupling mechanisms each include a first tongue extending in a first direction and a second tongue extending second direction opposite the first direction, the first tongue and the second tongue each offset from the rear surface. In a specific embodiment, hooks 216 extend to a distal end 219 furthest from front surface 215, the distal end 219 extending at least partially upward when longitudinal axis 217 is arranged vertically.

In a specific embodiment, coupling mechanism 212 is an actuating coupling mechanism substantially the same as coupling mechanism 10 or coupling mechanism 110 except for the differences described herein. In a specific embodiment, coupling mechanism 214 is a passive coupling mechanism (e.g., a non-actuating coupling mechanism with locking panels that remain stationary with respect to the panel of support structure 210) including locking panels that do not slide respect to each other. Applicant has observed that combining an actuating coupling mechanism with a passive coupling mechanism allows for the storage of tools, such as long handled tools, heavier tools (e.g., 5-13 lbs.), or awkwardly shaped tools such as string trimmers or sprayers. In a specific embodiment, active coupling mechanism 212 is arranged vertically, either above or below, passive coupling mechanism 214.

Figure 13:
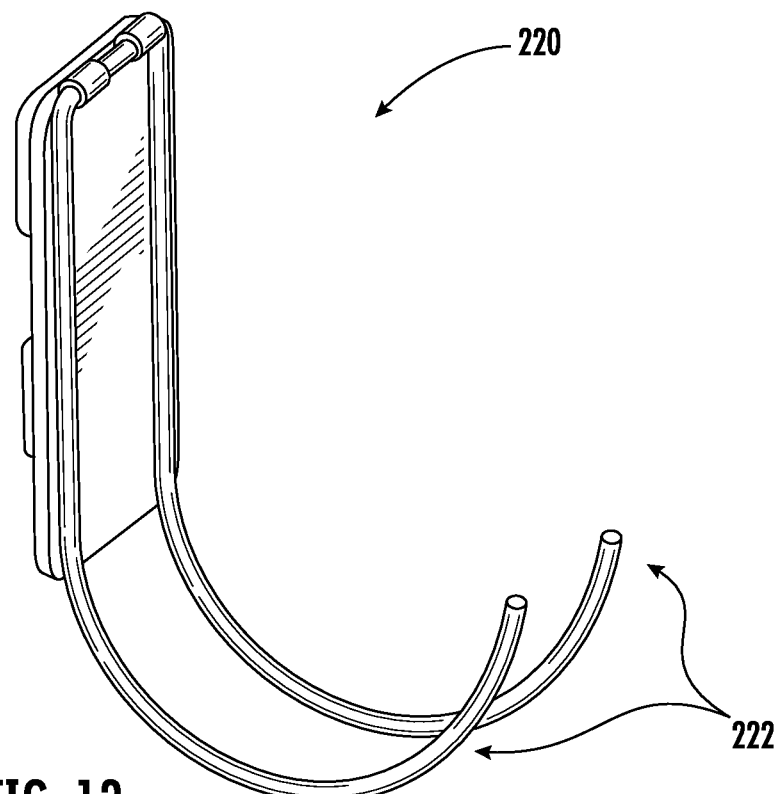
FIG. 13 is a perspective view of a support structure, according to an exemplary embodiment.

Referring to FIG. 13, support structure 220 is shown according to an exemplary embodiment. Support structure 220 is substantially the same as support structure 210 except for the differences discussed herein. Support structure 220 includes hooks 222 that support objects, such as tools. In a specific embodiment, hooks 222 are curved and are configured to store cords, long handled tools such as hammers, or medium handled tools.

Figure 14:
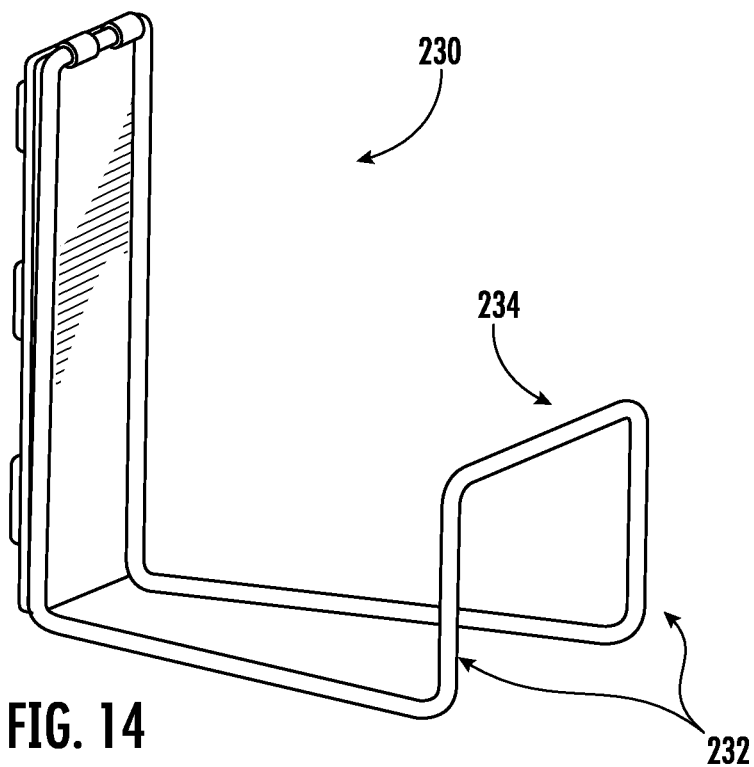
FIG. 14 is a perspective view of a support structure, according to an exemplary embodiment.

Referring to FIG. 14, support structure 230 is shown according to an exemplary embodiment. Support structure 230 is substantially the same as support structure 210 except for the differences discussed herein. Support structure 230 includes hooks 232 that support objects, such as tools. In a specific embodiment, hooks 232 are relatively large and include a cross-bar 234 connecting hooks 232. This arrangement provides additional strength such that hooks 232 are configured for holding large heavy items such as cords, hoses or ladders.

Figure 15:
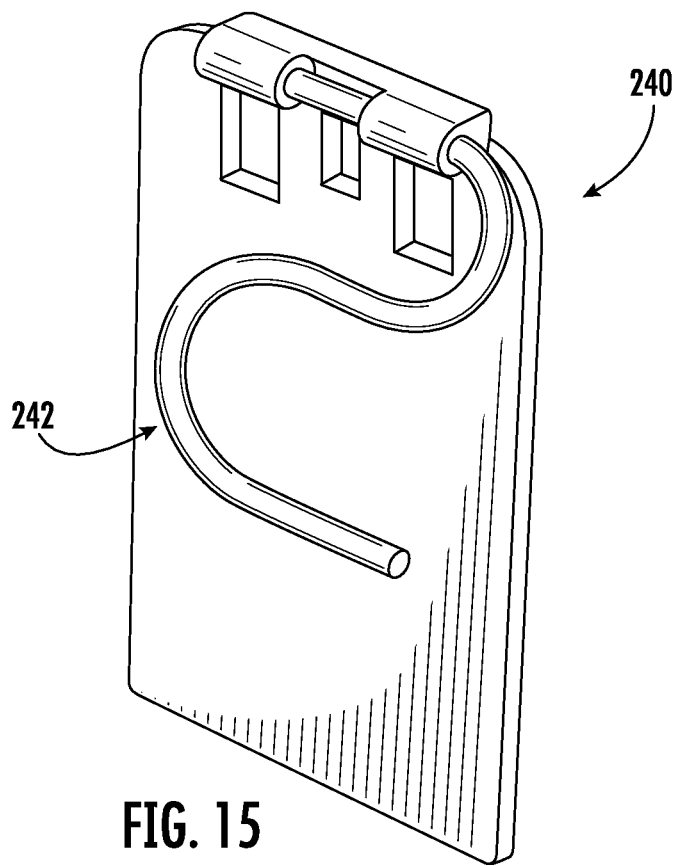
FIG. 15 is a perspective view of a support structure, according to an exemplary embodiment.
Figure 16:
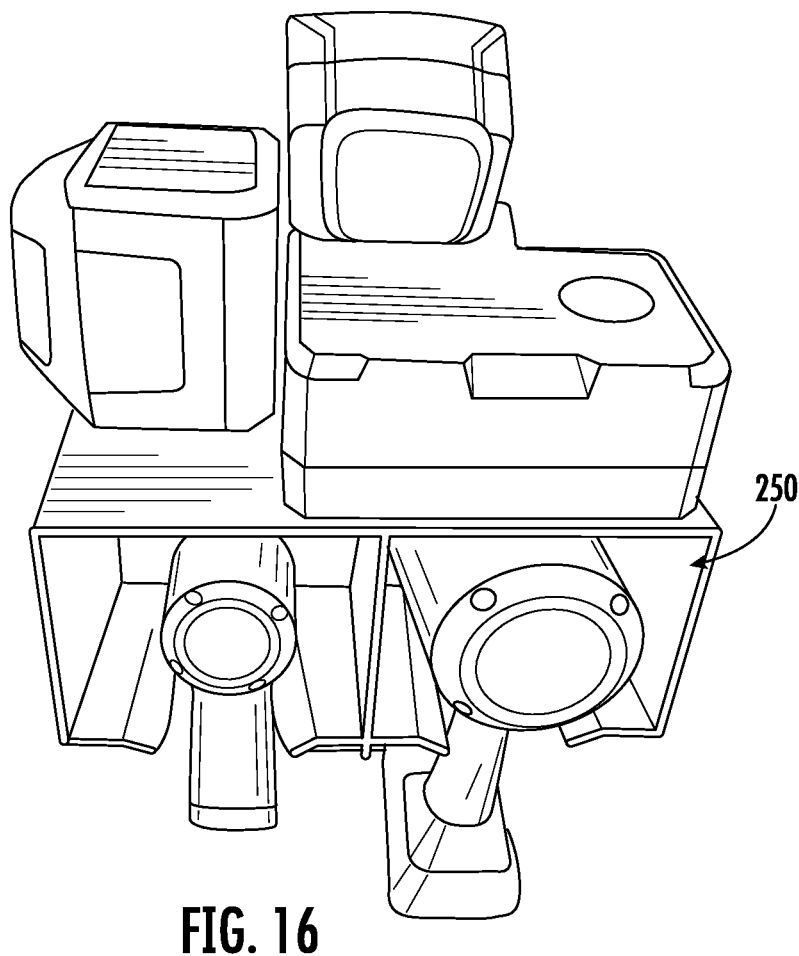
FIG. 16 is a perspective view of a support structure with tools and equipment, according to an exemplary embodiment.

Referring to FIG. 15, support structure 240 is shown according to an exemplary embodiment. Support structure 240 is substantially the same as support structure 210 except for the differences discussed herein. Support structure 240 includes hooks 242 that support objects, such as tools. In a specific embodiment, hooks 242 are s-shaped.

Referring to FIGS. 16-20, support structure 250 is shown according to an exemplary embodiment. Support structure 250 is substantially the same as support structure 210 except for the differences discussed herein. In general, support structure 250 is a multi-compartment support structure configured to support multiple tools and equipment, such as drills, batteries, and/or chargers, shown as tool 298 and tool 299.

Figure 17:
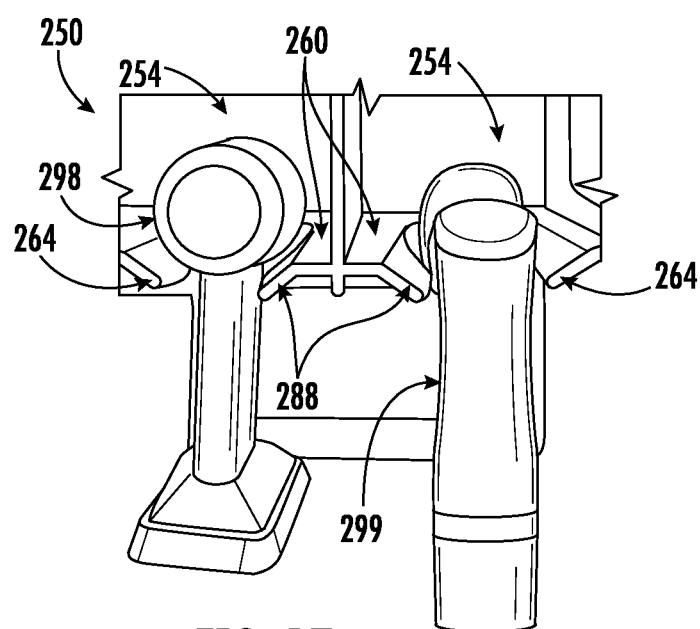
FIG. 17 is a front view of the support structure FIG. 16, according to an exemplary embodiment.
Figure 18:
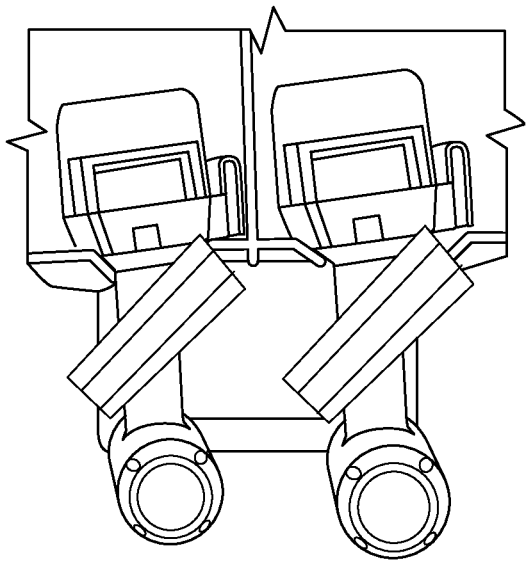
FIG. 18 is a front view of the support structure FIG. 16, according to an exemplary embodiment.

Referring to FIGS. 17-18, ledges 288 extend downward from bottom panels 260 and inward towards opposing ledge 288 into recesses 264. Recesses 264 are configured to receive tools 298, 299. In a specific embodiment, recesses 264 are sized to receive either heads of tools (FIG. 17) or batteries of some tools (FIG. 18).

Figure 19:
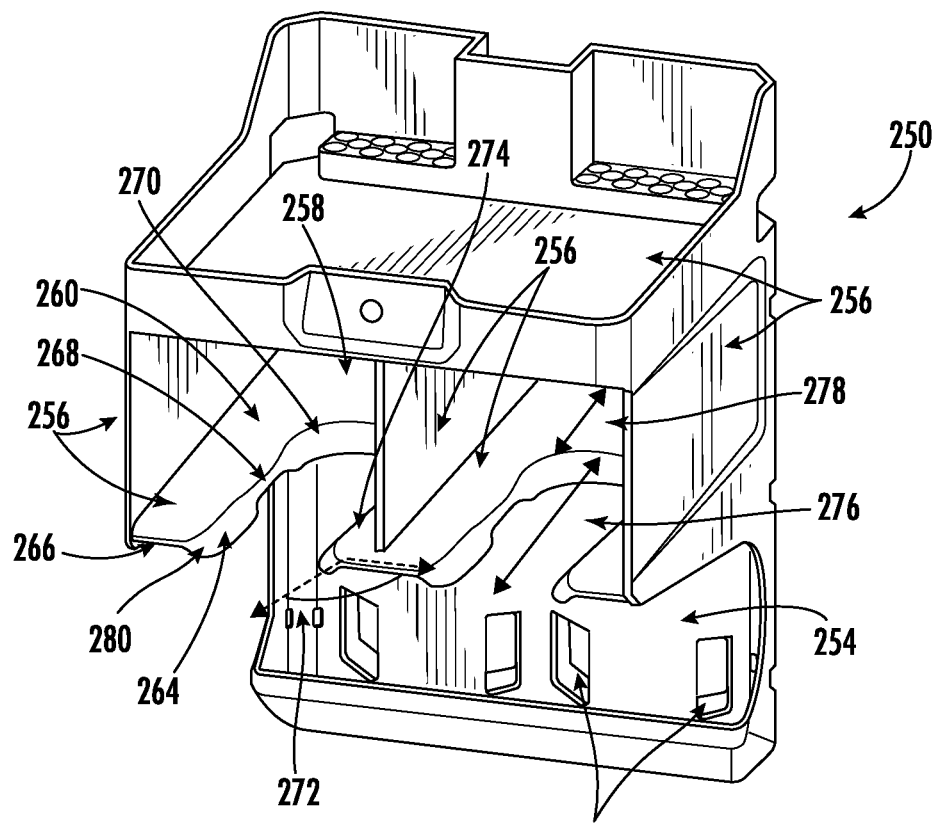
FIG. 19 is a perspective view of the support structure FIG. 16, according to an exemplary embodiment.
Figure 24:
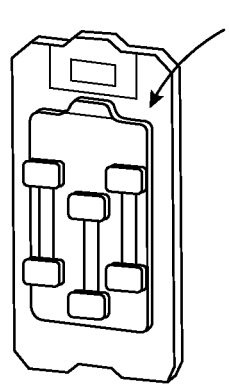
FIG. 24 is a perspective view of a support structure, according to an exemplary embodiment.
Figure 25:
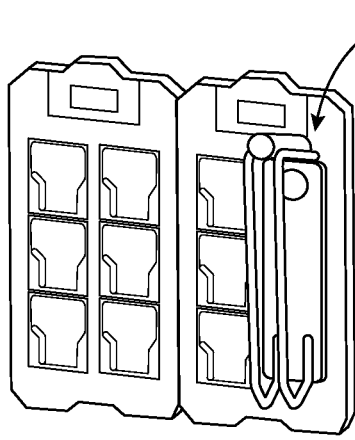
FIG. 25 is a perspective view of a support structure, according to an exemplary embodiment.
Figure 26:
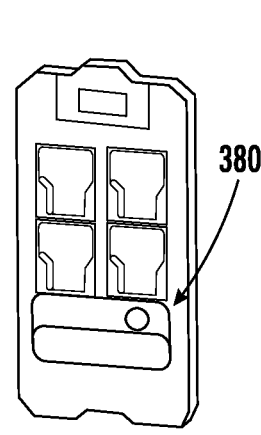
FIG. 26 is a perspective view of a support structure, according to an exemplary embodiment.
Figure 27:
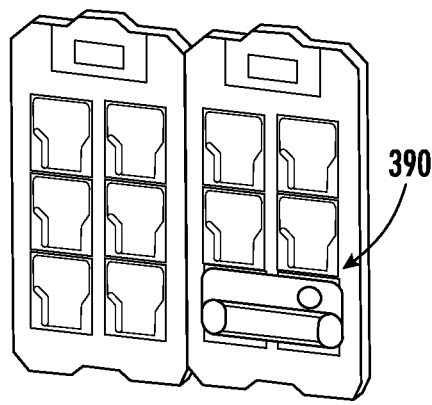
FIG. 27 is a perspective view of a support structure, according to an exemplary embodiment.
Figure 28:
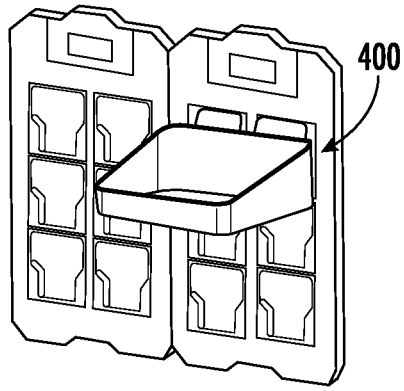
FIG. 28 is a perspective view of a support structure, according to an exemplary embodiment.

Referring to FIG. 19, support structure 250 includes a back panel 254 that is coupled to a surface, such as a wall, the back panel 254 including a rear surface 251 and an opposing front surface 252. A first plurality of panels 256 extend laterally from front surface 252 of back panel 254 to collectively define chamber 258, defined in part by bottom panel 260. Bottom panel 260 extends from back panel 254 to an opposing outer edge 266. Bottom panel 260 of first plurality of panels 256 includes a recess 264, the recess 264 configured to receive tools or equipment, such as tool 298 or tool 299. Recess 264 extends from an outer edge 266 of bottom panel 260 towards back panel 254. Recess 264 is defined by an interior edge 268 of bottom panel 260. In a specific embodiment, inner end 270 of interior edge 268 defines a curved shape, such as a semi-circular shape. In a specific embodiment, curve of inner end 270 provides a gentle stopping point after tools 298, 299 are inserted into chambers 258. In a specific embodiment, recess 264 is configured to receive and support a power tool.

Recess 264 extends length 276 from outer edge 266 towards back panel 254. Bottom panel 260 extends length 278 between inner end 270 of recess 264 and back panel 254. Outer portions 280 of recess 264, which are closest to outer edge 266, extend away from each other to provide a wider opening for users to insert tools into chamber 258.

Interior edge 268 of recess 264 is angled with respect to upper surface 274 of bottom panel 260 such that interior edge 268 extends away from upper surface 274. In a specific embodiment, angle 272 between interior edge 268 and upper surface 274 of bottom panel is between 110 degrees and 160 degrees, and more specifically between 130 degrees and 140 degrees.

Referring to FIG. 20, one or more coupling mechanisms, shown as couplers 284, extend from rear surface 251 of back panel 254. In a specific embodiment, couplers 284 are compatible with the coupling mechanism(s) described in International Patent Application No. PCT/US2018/044629, which is hereby incorporated by references in its entirety. In a specific embodiment, couplers each include a plurality of tongues that are offset from the rear surface, such as first tongue and a second tongue extending each extending away from each other. In a specific embodiment, the plurality of couplers 284 include a first row of at least two couplers 284 horizontally aligned with each other, and further includes a second row at least two couplers 284 horizontally aligned with each other, the second row below the first row. In a specific embodiment, the plurality of couplers 284 each include a first tongue that extends in a first direction and a second tongue that extends in a second direction opposite the first direction.

Support structure 250 includes an opening, shown as aperture 282 between back panel 254, upper panel 262 and a side panel. In a specific embodiment, aperture 282 is sized to receive a power cord. Support structure 250 includes an opening, shown as slots 286. In a specific embodiment, slots 286 are configured to receive elongate structures, such as zip ties, to couple objects, such as cords, to support structure 250.

In an alternate embodiment, support structure 250 includes openings and/or slots near a bottom of support structure 250 that are sized to receive USB cords for pass-through.

Referring to FIGS. 19-28, various support structures are shown. Support structure 310, support structure 320, support structure 320, support structure 330, support structure 340, support structure 350, support structure 360, support structure 370, support structure 380, support structure 390, and support structure 400 are substantially the same as support structure 210 except for the differences discussed herein. Support structure 310, support structure 320, support structure 320, support structure 330, support structure 340, support structure 350, support structure 360, support structure 370, support structure 380, support structure 390, and support structure 400 include a variety of elements configured to couple and/or support objects, tools and/or equipment.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A coupling mechanism comprising:
   a housing;
   a first locking panel comprising a first inner surface and an opposing first outer surface, the first locking panel slideably actuates along a first axis;
   a second locking panel comprising a second inner surface and an opposing second outer surface, the second outer surface facing away from the first outer surface, the second locking panel slideably actuates along the first axis;
   a locking mechanism rotateably coupled to the housing, the locking mechanism rotating with respect to the housing around a second axis, the locking mechanism actuating between an unlocked position and a locked position, the locking mechanism comprising an interfacing portion that interfaces with each of the first inner surface and the second inner surface, the first outer surface and the second outer surface define a first width when the locking mechanism is in the unlocked position, and when the locking mechanism actuates from the unlocked position to the locked position the locking mechanism biases the first locking panel and the second locking panel away from each other, such that when the locking mechanism is in the locked position the first outer surface and the second outer surface define a second width greater than the first width; and
   a first biasing element that biases the first locking panel towards the second locking panel.

2. The coupling mechanism of claim 1, comprising a second biasing element that biases the second locking panel towards the first locking panel.

3. The coupling mechanism of claim 1, wherein the first locking panel and the second locking panel each comprise an upper surface configured to interface against opposing tabs extending over a recess defined by a modular storage unit, the coupling mechanism configured to be coupled within the recess of the modular storage unit.

4. The coupling mechanism of claim 1, further comprising:
   a shaft coupled to the locking mechanism, the shaft comprises a detent that biases the locking mechanism to remain in the locked position.

5. The coupling mechanism of claim 1, the interfacing portion of the locking mechanism defining an oval shape.

6. The coupling mechanism of claim 1, the interfacing portion of the locking mechanism defining a first diameter and a second diameter longer than the first diameter, wherein the first diameter is aligned with the first axis when the locking mechanism is in the unlocked position and the second diameter is aligned with the first axis when the locking mechanism is in the locked position.

7. The coupling mechanism of claim 6, comprising a second biasing element that biases the second locking panel towards the first locking panel.

8. A coupling mechanism comprising:
   a housing;
   a first locking panel that slideably actuates along a first axis;
   a second locking panel that slideably actuates along the first axis, the first locking panel and the second locking panel collectively defining a width; and
   a cam rotateably coupled to the housing, the cam comprising a periphery that interfaces with each of the first locking panel and the second locking panel, the cam rotating with respect to the housing around a second axis, the cam actuating between an unlocked position and a locked position, the cam comprising:
- a first portion of the periphery that interfaces with the first locking panel, the first portion extending from a first end to a second end, the first end extending a first distance from the second axis and the second end extending a second distance from the second axis further than the first distance, and wherein the first portion biases the first locking panel away from the second locking panel when the cam actuates from the unlocked position to the locked position;
- a second portion of the periphery that interfaces with the second locking panel, the second portion extending from a third end to a fourth end, the third end extending the first distance from the second axis and the fourth end extending the second distance from the second axis, and wherein the second portion biases the second locking panel away from the first locking panel when the cam actuates from the unlocked position to the locked position;
- a first ledge that extends between the first end of the first portion and the fourth end of the second portion, the first ledge biasing the second locking panel towards the first locking panel when the cam actuates from the locked position to the unlocked position; and
- a second ledge that extends between the third end of the second portion and the second end of the first portion, the second ledge biasing the first locking panel towards the second locking panel when the cam actuates from the locked position to the unlocked position.

9. The coupling mechanism of claim 8, wherein the second axis is perpendicular to the first axis.

10. The coupling mechanism of claim 8, wherein the first locking panel and the second locking panel each comprise an upper surface configured to interface against opposing tabs extending over a recess defined by a modular storage unit, the coupling mechanism configured to be coupled within the recess of the modular storage unit.

11. The coupling mechanism of claim 8, the first ledge comprises a first interfacing surface that interfaces with the second locking panel, the first interfacing surface generally radially aligned with the second axis.

12. The coupling mechanism of claim 11, the second ledge comprises a second interfacing surface that interfaces with the first locking panel, the second interfacing surface generally radially aligned with the second axis.

13. The coupling mechanism of claim 8, the housing comprising a front surface that faces away from the first locking panel and the second locking panel, the coupling mechanism comprising:
- a curved recess in the front surface of the housing, the curved recess extending circumferentially around the second axis from a first end to a second end; and
- an interfacing element rotateably coupled to the housing, the interfacing element coupled to the cam such that the interfacing element rotates with respect to the housing about the second axis, a portion of the interfacing element rotating within the curved recess between the first end and the second end when the cam actuates between an unlocked position and a locked position.

* * * * *